United States Patent
Nagayoshi et al.

(10) Patent No.: US 7,733,467 B2
(45) Date of Patent: Jun. 8, 2010

(54) OPTICAL PASSIVE DEVICE PRODUCT IDENTIFICATION APPARATUS AND CONNECTIVITY DETERMINATION APPARATUS

(75) Inventors: Tatsuo Nagayoshi, Fukuoka (JP); Akira Yamamoto, Fukuoka (JP); Katsumi Sugawa, Fukuoka (JP); Makoto Ohtou, Fukuoka (JP); Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 12/044,313

(22) Filed: Mar. 7, 2008

(65) Prior Publication Data

US 2008/0231843 A1 Sep. 25, 2008

(30) Foreign Application Priority Data

Mar. 20, 2007 (JP) ............................. 2007-072202

(51) Int. Cl.
*G01N 21/00* (2006.01)

(52) U.S. Cl. ...................................... 356/73.1

(58) Field of Classification Search ....................... None
See application file for complete search history.

(56) References Cited

U.S. PATENT DOCUMENTS

2005/0074244 A1* 4/2005 Roberts et al. .............. 398/139

FOREIGN PATENT DOCUMENTS

| JP | 04-095422 | 3/1992 |
| JP | 2003-60577 | 2/2003 |

* cited by examiner

*Primary Examiner*—Tu T Nguyen
(74) *Attorney, Agent, or Firm*—Staas & Halsey LLP (57) ABSTRACT

An identification apparatus for identifying an optical passive device product. The apparatus includes an optical input output monitor section for monitoring an optical input and an optical output of the optical passive device product respectively; a loss calculation section for calculating a loss in the optical passive device product based on a monitoring result of the optical input output monitor section; and a product identification section in which product information indicating a correspondence between a loss characteristic and a product has been stored in advance, and which identifies the optical passive device product by comparing the stored product information and the loss calculated by the loss calculation section.

4 Claims, 9 Drawing Sheets

| DISPERSION [PS/NM] Loss | Loss min. @1550nm [dB] | Loss max. @1550nm [dB] |
|---|---|---|
| 100 (PRODUCT A) | 1.3 | 2.1 |
| 400 (PRODUCT B) | 2.3 | 3.4 |
| 1000 (PRODUCT C) | 4.5 | 6.0 |
| 1600 (PRODUCT D) | 6.8 | 8.3 |
| 2000 (PRODUCT F) | 8.4 | 9.9 |

FIG. 5

| Loss<br>PAD [dB] | Loss min.<br>@1550nm [dB] | Loss max.<br>@1550nm [dB] |
|---|---|---|
| 3 (PRODUCT G) | 2.5 | 3.5 |
| 5 (PRODUCT H) | 4.5 | 5.5 |
| 10 (PRODUCT J) | 9.5 | 10.5 |

| LOSS CALCULATION RESULT [dB] / DETERMINATION RESULT | CONNECTIVITY DETERMINATION RESULT |
|---|---|
| 0~4.4 | ABNORMAL (DIRECT CONNECTION, IMPROPER INSTALLATION, ETC.) |
| 4.5~6.0 | NORMAL |
| 6.1~10.0 | ABNORMAL (CONTAMINATED CONNECTOR, IMPROPER INSTALLATION, ETC.) |
| 10.1~ | ABNORMAL (IMPROPER CONNECTION, DISCONNECTION, ETC.) |

OPTICAL PASSIVE DEVICE PRODUCT IDENTIFICATION APPARATUS AND CONNECTIVITY DETERMINATION APPARATUS

BACKGROUND OF THE INVENTION

1. Technical Field

The present embodiment relates to an identification apparatus and a connectivity determination apparatus for an optical passive device such as a dispersion compensator for use in an optical communications network.

2. Description of the Related Art

For example, as disclosed in Japanese Patent Laid-Open No. 2003-60577, in order to provide a long-distance transmission of a wavelength-multiplexed optical signal in a long-distance optical communications network, a dispersion compensator is used to compensate for an optical signal wave distortion caused by a transmission line optical fiber. In recent years, a virtually imaged phased array (VIPA) variable dispersion compensator capable of collectively compensating for a plurality of waves has also been used as this dispersion compensator. However, in terms of cost and reliability, many dispersion compensation fibers (DCF) are still in use today. The DCF is selectively used according to the transmission distance and the transmission line fiber type.

The DCF is a passive device without requiring a power supply and is excellent in reliability as a dispersion compensation product, but maintenance is required. As for a product to which power is supplied, it is possible to identify and manage the product by installing a nonvolatile storage medium in the product and storing the product identification information in the storage medium. However, the method of identifying a product using such a storage medium cannot be applied to the DCF, and only a method of checking a label attached on a surface of the product can be used to identify the DCF. For that reason, it is troublesome to perform maintenance work on a DCF provided in a remote transmission apparatus.

SUMMARY

According to an aspect of an embodiment, an identification apparatus for identifying an optical passive device product comprises: an optical input output monitor section for monitoring an optical input and an optical output of the optical passive device product respectively; a loss calculation section for calculating a loss in the optical passive device product based on a monitoring result of the optical input output monitor section; and a product identification section in which product information indicating a correspondence between a loss characteristic and a product has been stored in advance, and which identifies the optical passive device product by comparing the stored product information and the loss calculated by the loss calculation section.

According to still another aspect of an embodiment, a connectivity determination apparatus for determining a connectivity of an optical passive device product comprises: an optical input output monitor section for monitoring an optical input and an optical output of the optical passive device product respectively; a loss calculation section for calculating a loss in the optical passive device product based on a monitoring result of the optical input output monitor section; and a connectivity determination section in which loss characteristic information of the optical passive device product has been stored in advance, and which determines a connectivity of the optical passive device product by comparing the stored loss characteristic information and the loss calculated by the loss calculation section.

The above aspects of embodiments are examples. All embodiments are not intended to be limited to including all the aspects, or to including all the features, in the above examples.

DETAILED DESCRIPTION OF THE EMBODIMENTS

Hereinafter, preferred embodiments of an identification apparatus and a connectivity determination apparatus for an optical passive device product in accordance with the present embodiment will be described in detail with reference to the drawings.

First Embodiment

Figure 1:
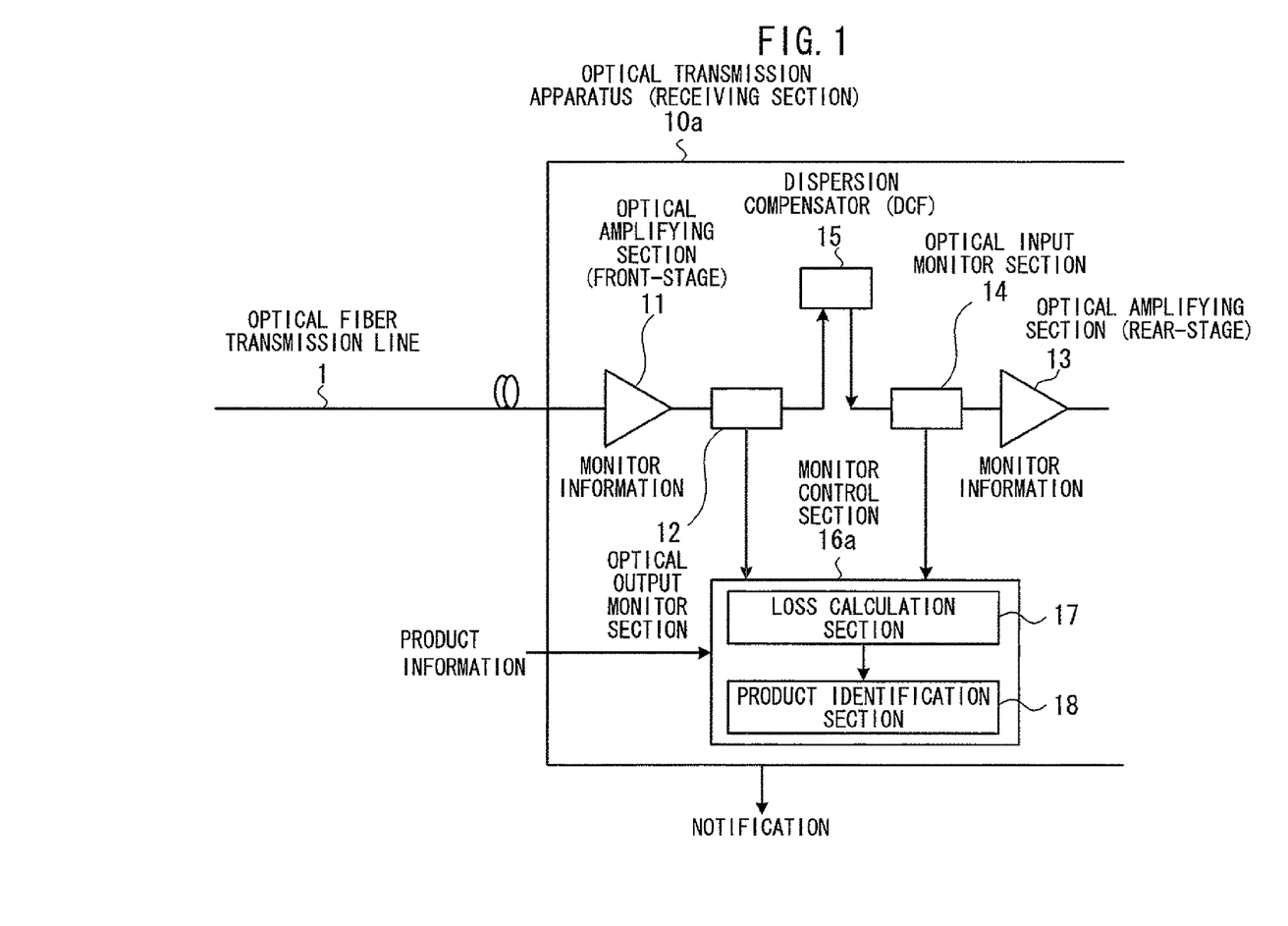
FIG. 1 is a block diagram showing a configuration of a transmission apparatus provided with a passive device product identification apparatus in accordance with a first embodiment.

FIG. 1 is a block diagram showing a basic configuration of an optical transmission apparatus provided with an optical passive device product identification apparatus in accordance with a first embodiment.

In FIG. 1, a receiving section of an optical transmission apparatus 1a is disposed in the middle of an optical fiber transmission line 1.

The receiving section of the optical transmission apparatus 10a includes, for example, an optical amplifying section 11 disposed in a front stage to amplify an optical signal attenuated in the optical fiber transmission line 1; a dispersion compensator (DCF) 15 for compensating for a wave dispersion in the optical fiber transmission line 1 based on an optical signal outputted by the optical amplifying section 11 disposed in the front stage; an optical amplifying section 13 disposed in a rear stage, which compensates for a shortage of amplification by the optical amplifying section 11 disposed in the front stage and an amount of attenuation by the dispersion compensator 15 and then passes a desired level of optical signal to a processing system in the rear stage; and a monitor control section 16a for performing warning monitoring and control on the optical transmission apparatus 10a.

The optical transmission apparatus 10a is provided with an identification apparatus for the dispersion compensator 15, which is an optical passive device product.

The identification apparatus includes: an optical output monitor section 12 which monitors the level of an optical signal which the optical amplifying section 11 in the front stage outputs to the dispersion compensator 15; an optical input monitor section 14 which monitors the level of an optical signal which is inputted from the dispersion compensator 15 to the optical amplifying section 13 in the rear stage; and the monitor control section 16a.

The monitor control section 16a is provided with a loss calculation section 17 and a product identification section 18.

Product information provided from outside to the product identification section 18 is information indicating a correspondence between a loss characteristic and a product.

The loss calculation section 17 uses an optical input monitor value received from the optical output monitor section 12 and an optical output monitor value received from the optical input monitor section 14 to calculate a loss in the dispersion compensator 15. The product identification section 18 uses the product information provided from the outside and a loss calculated by the loss calculation section 17 to identify characteristics of the dispersion compensator 15. The monitor control section 16a is configured to notify the outside of the identification result. For example, a LAN can be used to notify a management center and the like.

Figure 2:
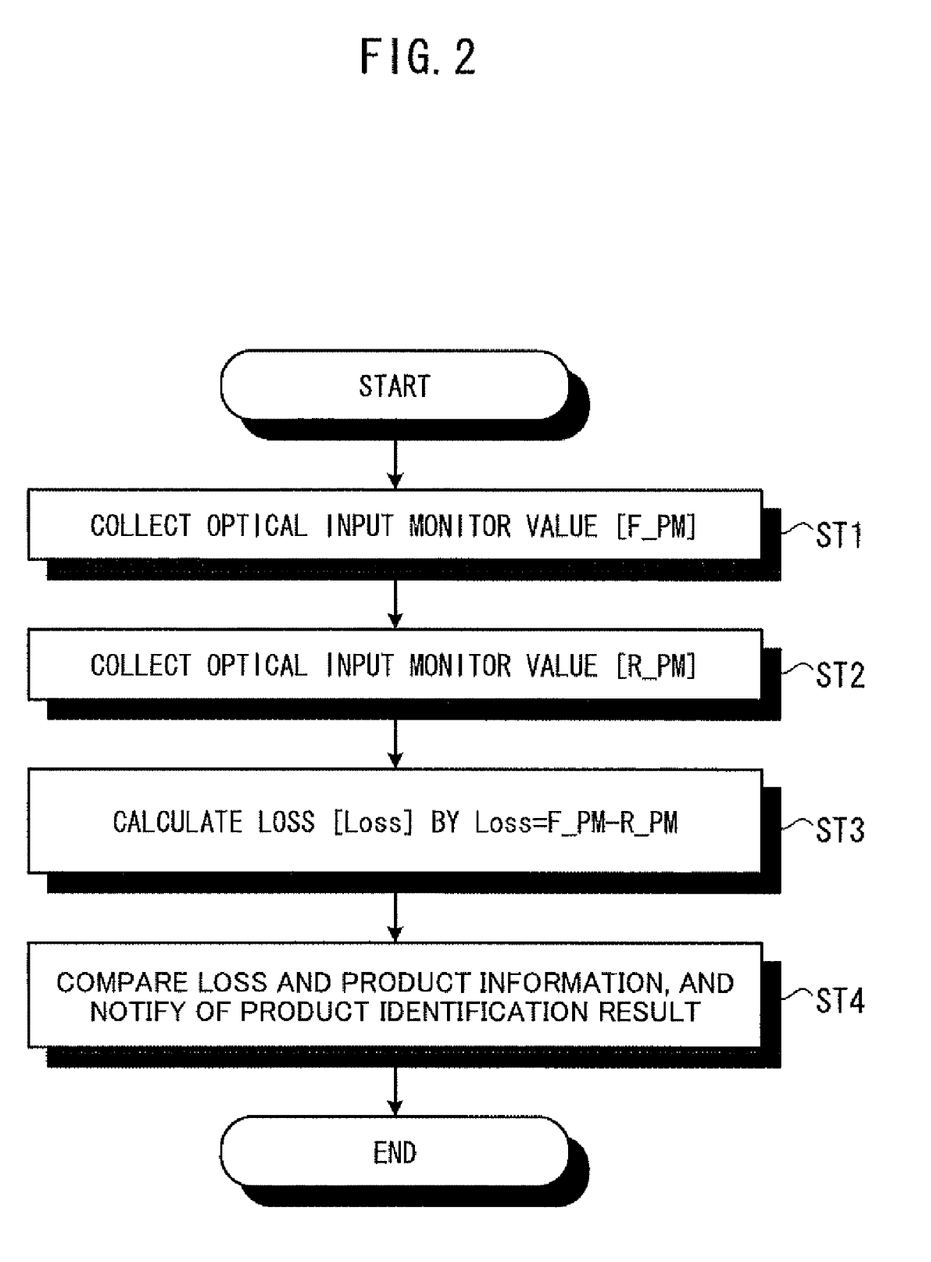
FIG. 2 is a flowchart explaining a product identification procedure of a monitor control section shown in FIG. 1.

Hereinafter, an operation of the optical passive device product identification apparatus in accordance with the first embodiment will be described with reference to FIG. 2. FIG. 2 is a flowchart explaining a product identification procedure of the monitor control section 16a shown in FIG. 1. It should be noted that an abbreviated word "ST" is used for a step indicating a procedure.

In FIG. 2, the monitor control section 16a sends an output instruction to the optical output monitor section 12 and the optical input monitor section 14. The monitor control section 1a collects an optical input monitor value [F_PM] from the optical output monitor section 12 and passes the value to the loss calculation section 17 (ST 1).

The monitor control section 16a collects an optical output monitor value [R_PM] from the optical input monitor section 14 and passes the value to the loss calculation section 17 (ST 2).

The loss calculation section 17 performs calculation of Loss=F_PM−R_PM to obtain a loss [Loss] (ST 2).

The product identification section 18 compares the loss calculated by the loss calculation section 17 and the product information (correspondence table between a loss and a product) which has been stored in advance. The product identification section 18 identifies characteristics of the dispersion compensator 15 installed in the optical transmission apparatus 10a. The monitor control section 16a notifies the outside of the identification result (ST 4).

As described above, the optical transmission apparatus 10a of the first embodiment can perform a product identification on the dispersion compensator 15 and notification thereof in a simple manner without newly installing a nonvolatile storage medium for storing product identification information in the dispersion compensator 15, thereby enabling a centralized management.

If the optical transmission apparatus 10a is provided with an optical input output monitor functions which means that the optical output monitor section 12 and the optical input monitor section 14 have already been installed, the first embodiment does not need to add or change hardware. All that is needed to identify the dispersion compensator 15 is to add some software to the monitor control section 16a, the software being capable of performing processes of the loss calculation section 17 and the product identification section 18.

It should be noted that for convenience of description, the dispersion compensator 15 is shown as an optical passive device product in FIG. 1, but the first embodiment is not limited to this, and can be applied to any optical passive device products whose loss characteristics are different depending on the product characteristic types such as a fixed optical attenuator which is an optical passive device product.

Figure 3:
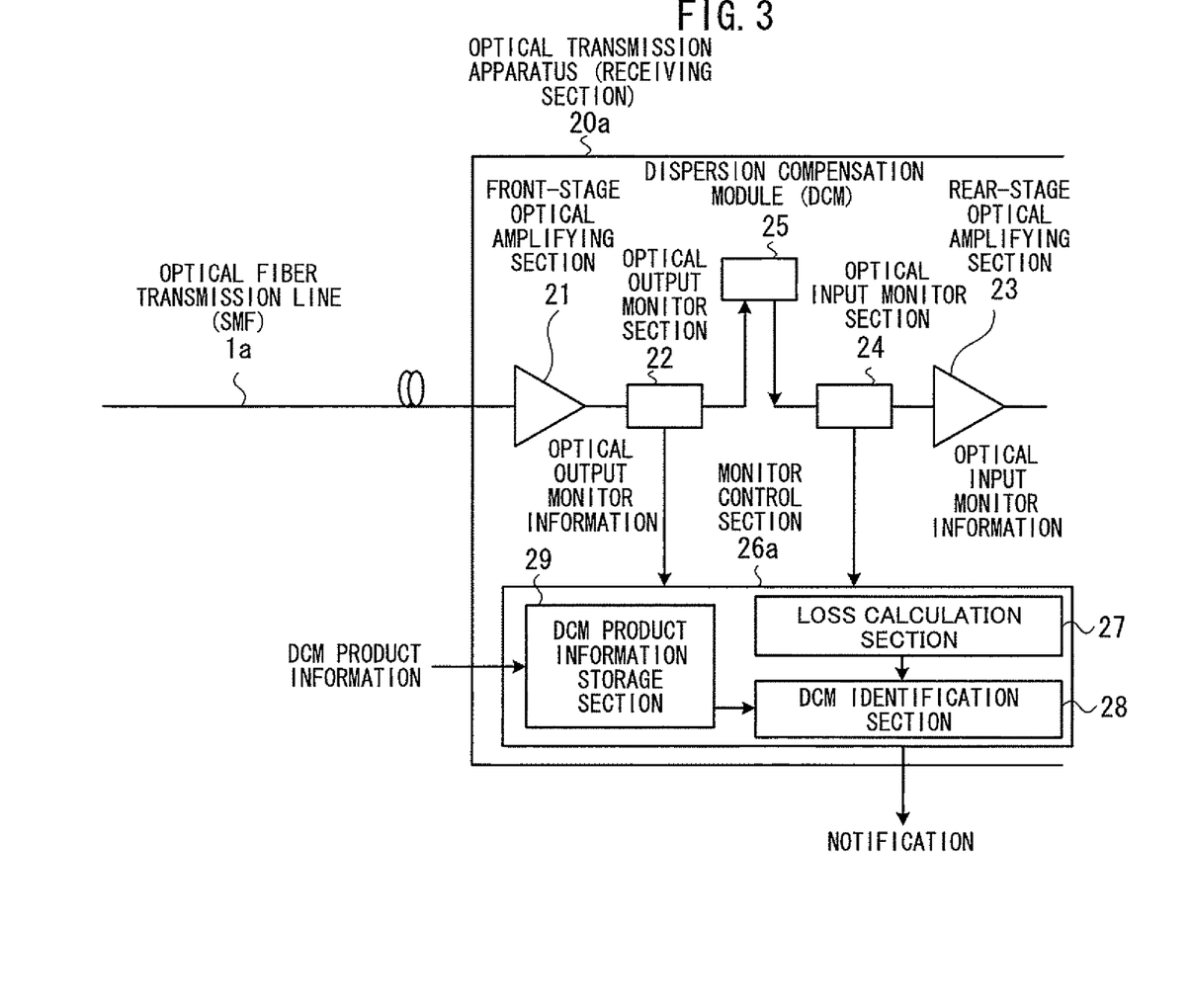
FIG. 3 is a block diagram showing a configuration of a transmission apparatus provided with a passive device product identification apparatus according to an embodiment.

Hereinafter, specific applications will be described with reference to FIGS. 3 to 5. FIG. 3 is a block diagram showing a configuration of an optical transmission apparatus provided with a passive device product identification apparatus according to an embodiment of the optical passive device product identification apparatus in accordance with the first embodiment.

In FIG. 3, an optical fiber transmission line 1a is, for example, a transmission line using a single mode fiber (SMF). A receiving section of an optical transmission apparatus 20a disposed in the middle of the optical fiber transmission line 1a includes, for example, a front-stage optical amplifying section 21 for amplifying an optical signal attenuated in the optical fiber transmission line 1a; a dispersion compensation module (DCM) 25 for compensating for a wave dispersion in the optical fiber transmission line 1a based on an optical signal outputted by the front-stage optical amplifying section 21; a rear-stage optical amplifying section 23, which compensates for a shortage of amplification by the front-stage optical amplifying section 21 and an amount of attenuation by the DCM 25 and then passes a desired level of optical signal to a processing system in the rear stage; and a monitor control section 26a for performing warning monitoring and control on the optical transmission apparatus 20a.

In the optical transmission apparatus 20a, an identification apparatus for the DCM 25, which is a passive device product, includes: an optical output monitor section 22 which monitors the level of an optical signal which the front-stage optical amplifying section 21 outputs to the DCM 25; an optical input monitor section 24 which monitors the level of an optical signal which is inputted from the DCM 25 to the rear-stage optical amplifying section 23; and the monitor control section 26a.

The monitor control section 26a includes a loss calculation section 27, a DCM identification section 28, and a DCM product information storage section 29.

The optical output monitor section 22 and the optical input monitor section 24 give monitor information to the loss calculation section 27 respectively according to an output instruction of the monitor control section 26a.

The loss calculation section 27 uses an optical input monitor value [F_PM] received from the optical output monitor section 22 and an optical output monitor value [R_PM] received from the optical input monitor section 24 to calculate a loss [Loss] of the DCM 25 by performing calculation of DCM Loss[dB]=F_PM[dBm]−R_PM[dBm]. The loss calculation section 27 passes the value of DCM 25 loss to the DCM identification section 28.

For example, in the case of F_PM=10 [dBm] and R_PM=4 [dBm], the loss [Loss] is obtained as Loss=10−4=6 [dB].

The DCM product information storage section 29 has DCM product information (correspondence table between a DCM loss and a product, see FIG. 4), which has been stored in advance as one of the initial settings for the optical transmission apparatus 20a. The DCM identification section 28 compares the DCM 25 loss [Loss] calculated by the loss calculation section 27 and the DCM product information stored in advance in the DCM product information storage section 29 to perform a product identification on the DCM 25.

Figure 4:
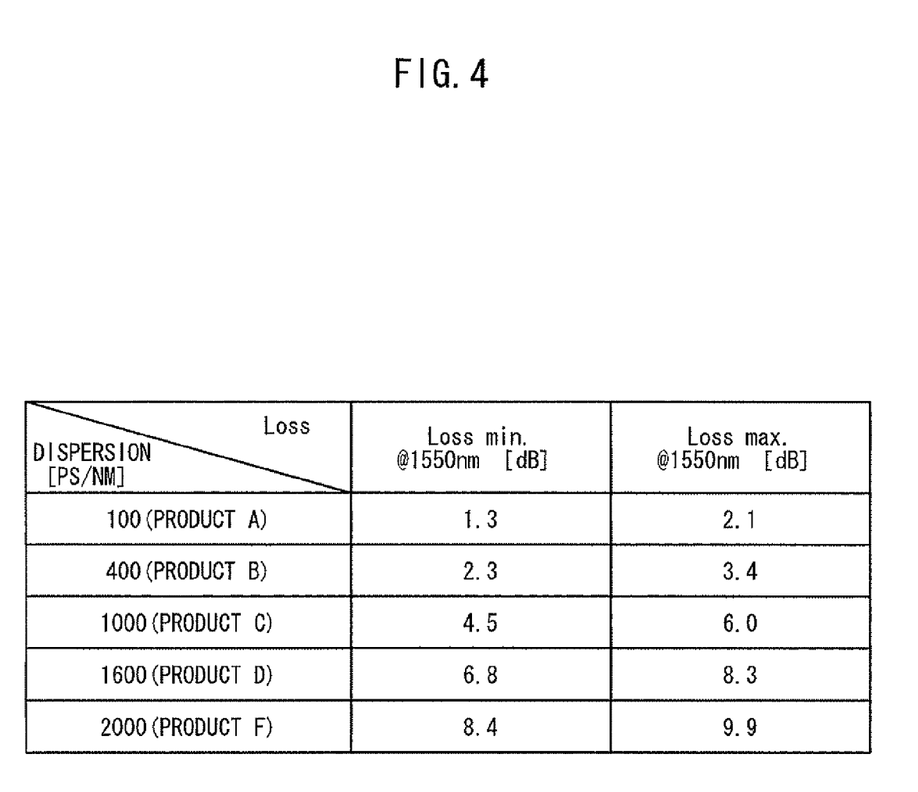
FIG. 4 is an example of a correspondence table between a DCM loss and a product.

FIG. 4 is an example of a correspondence table between a DCM loss and a product. The correspondence table shown in FIG. 4 lists DCM products which are divided by dispersion characteristic [ps/nm] into five types of products: product A, product B, product C, product D, and product F, each of whose loss characteristics is defined by a minimum loss or Loss min [dB] and a maximum loss or Loss max [dB] at 1,550 nm wavelength.

More specifically, if the DCM loss calculated by the loss calculation section 27 is, for example, 5 dB, the DCM identification section 28 identifies the DCM 25 as a product C (1000 ps/nm) from the correspondence table of FIG. 4

As described above, the first embodiment can be applied to any optical passive device products whose loss characteristics are different depending on the product characteristic types. For example, if a fixed optical attenuator (PAD) is installed, similar product identification can be performed by providing a table as shown in FIG. 5 in advance.

Figure 5:
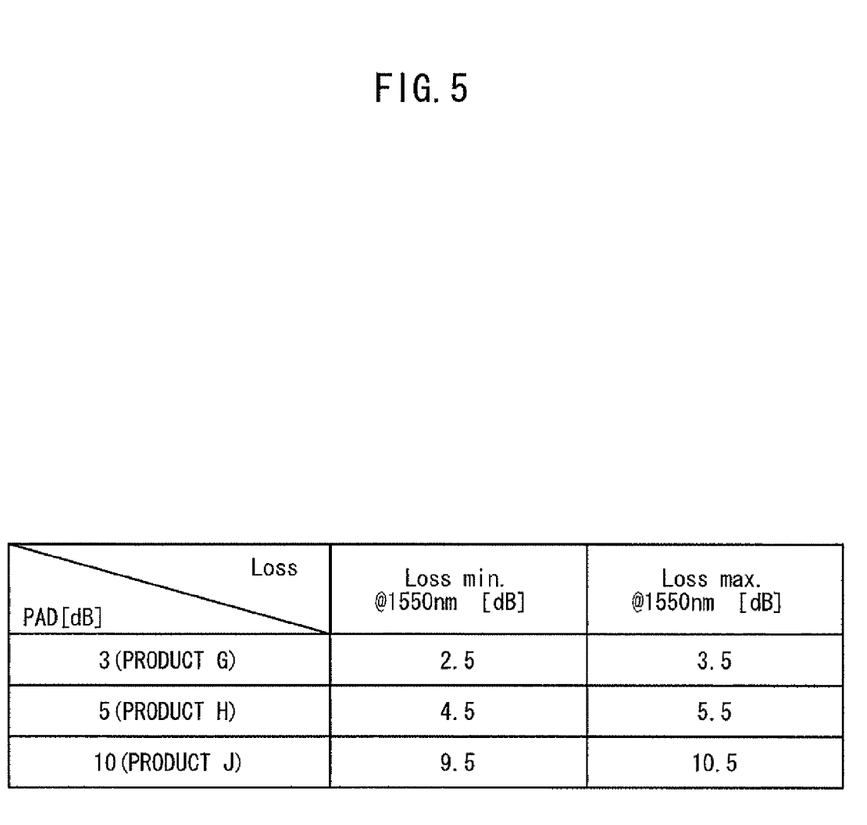
FIG. 5 is an example of a correspondence table between a fixed optical attenuator loss and a product.

FIG. 5 is an example of a correspondence table between a fixed optical attenuator loss and a product. The correspondence table shown in FIG. 5 lists fixed optical attenuator products which are divided into three types of products by attenuation [dB]: product G, product H, and product J, each of whose loss characteristics is defined by a minimum loss or Loss min [dB] and a maximum loss or Loss max [dB] at 1,550 nm wavelength.

According to the first embodiment, identification can easily be performed on an installed optical passive device product such as a DCM and a fixed optical attenuator. Even if the optical passive device product is installed in a remote transmission apparatus, identification can easily be performed on the product without going to the actual place, thereby increasing the maintainability.

Second Embodiment

Figure 6:
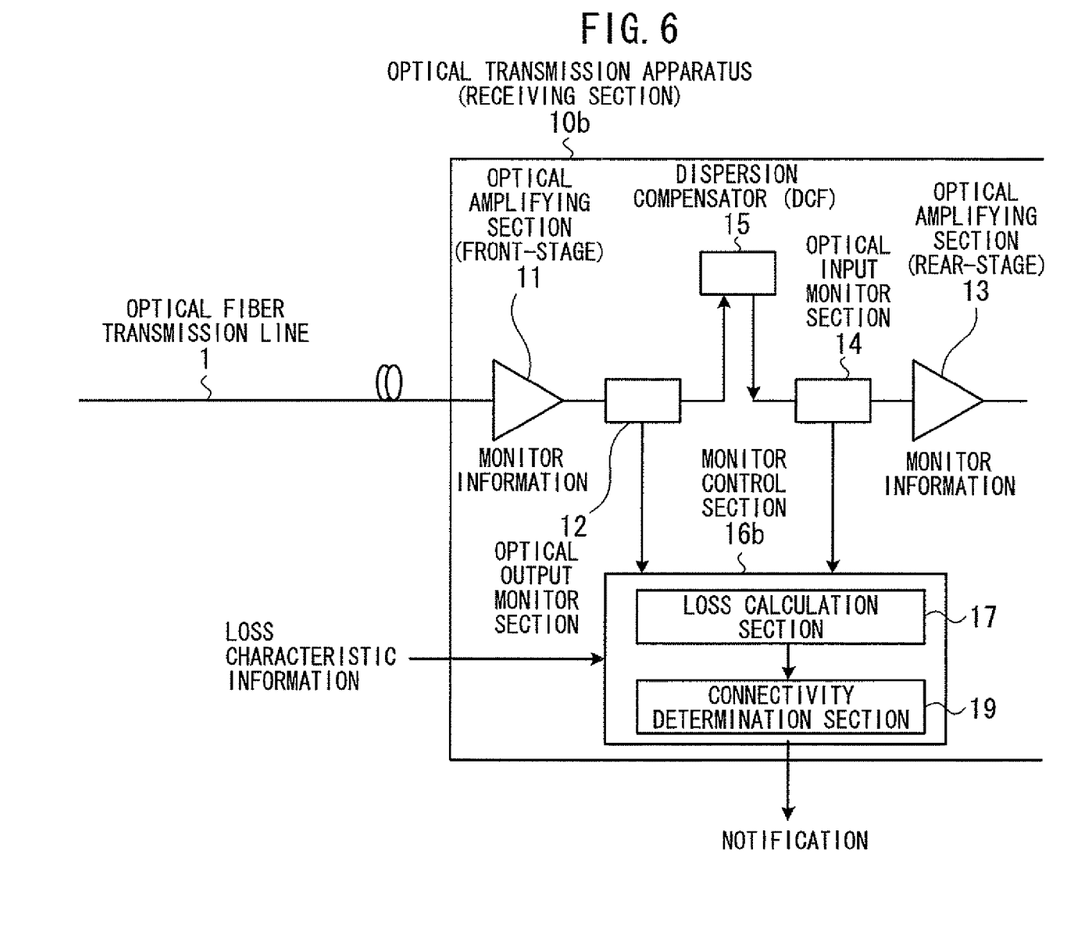
FIG. 6 is a block diagram showing a configuration of a transmission apparatus provided with a passive device product connectivity determination apparatus in accordance with a second embodiment.

FIG. 6 is a block diagram showing a basic configuration of an optical transmission apparatus provided with an optical passive device product connectivity determination apparatus in accordance with a second embodiment. It should be noted that, for convenience of description, a like numeral in FIG. 6 refers to a like component in FIG. 1 (first embodiment). The following description will be focused on the features specific to the second embodiment.

As shown in FIG. 6, an optical transmission apparatus 10b provided with the optical passive device product connectivity determination apparatus in accordance with the second embodiment has a monitor control section 16b instead of the monitor control section 16a in the configuration shown in FIG. 1 (first embodiment). The monitor control section 16b replaces the product identification section 18 with a connectivity determination section 19. Loss characteristic information provided from outside to the connectivity determination section 19 indicates loss characteristics of the installed dispersion compensator 15.

Figure 7:
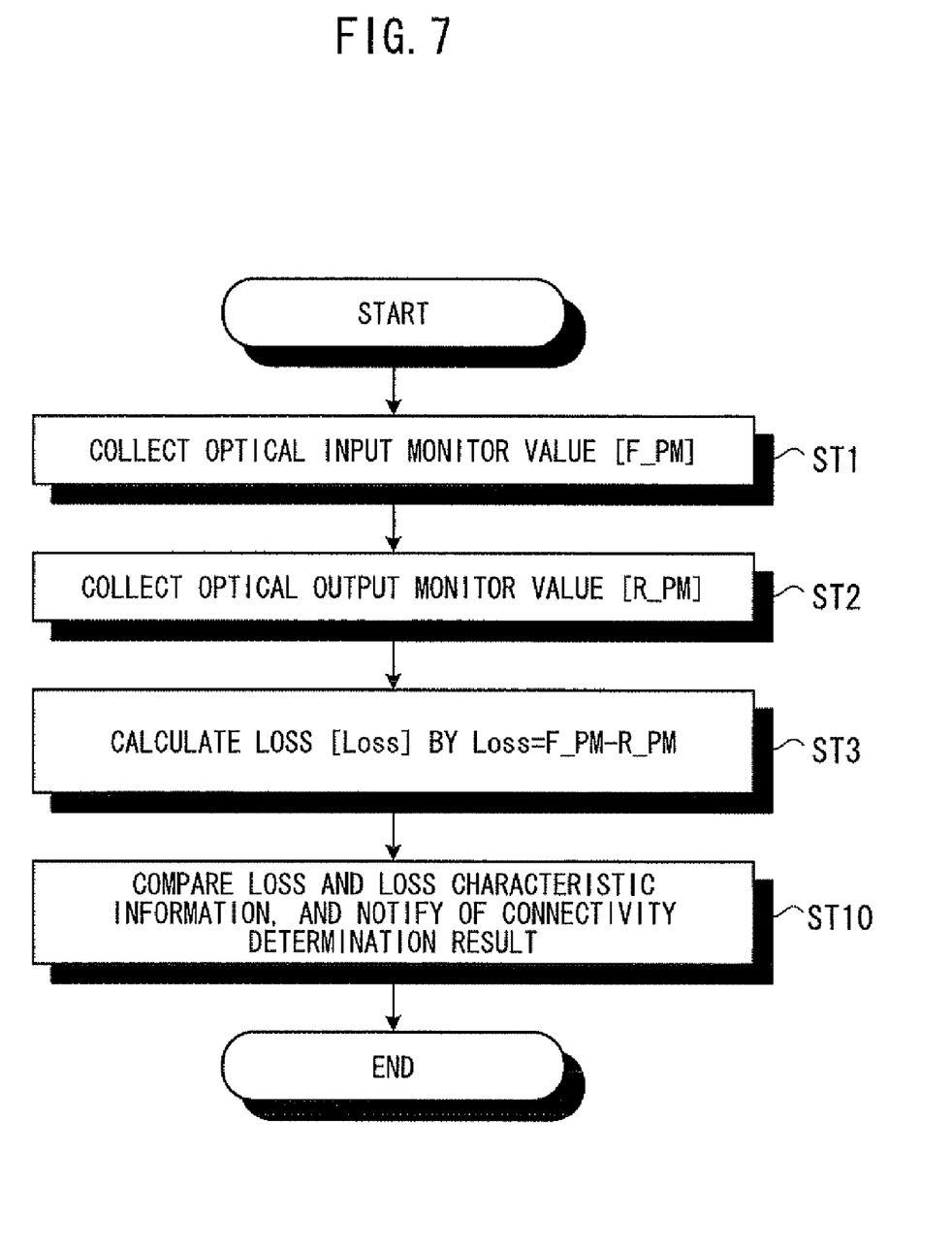
FIG. 7 is a flowchart explaining a connectivity determination procedure of a monitor control section shown in FIG. 6.

Hereinafter, with reference to FIG. 7, an operation of the optical passive device product connectivity determination apparatus in accordance with the second embodiment will be described. FIG. 7 is a flowchart explaining a connectivity determination procedure of the monitor control section shown in FIG. 6. It should be noted that a like numeral in FIG. 7 refers to a like procedure in FIG. 2. In other words, in FIG. 7, ST 4 shown in FIG. 2 is replaced with ST 10.

At ST 10, the connectivity determination section 19 determines the connectivity (connection quality and defects) of the dispersion compensator 15 by comparing the loss characteristic information provided from the outside and the loss calculated by the loss calculation section 17. The monitor control section 16b notifies the outside of the determination result. For example, a LAN can be used to notify the management center and the like.

As described above, in a simple configuration, it is possible to detect and notify of the connectivity (connection quality and defects) of the dispersion compensator 15 which was or is installed in the optical transmission apparatus 10b, thereby increasing the reliability of an optical transmission apparatus.

Like the first embodiment, if the optical transmission apparatus 10b is provided with an optical input output monitor function, which means that the optical output monitor section 12 and the optical input monitor section 14 have already been installed, the second embodiment does not need to add or change hardware. All that is needed to identify the dispersion compensator 15 is to add some software to the monitor control section 16b, the software being capable of performing processes of the loss calculation section 17 and the connectivity determination section 19.

It should be noted that for convenience of description, the dispersion compensator 15 is shown as an optical passive device product in FIG. 6, but the second embodiment is not limited to this, and can be applied to any optical passive device products whose loss characteristics are different depending on the product types such as a fixed optical attenuator which is a optical passive device product.

Figure 8:
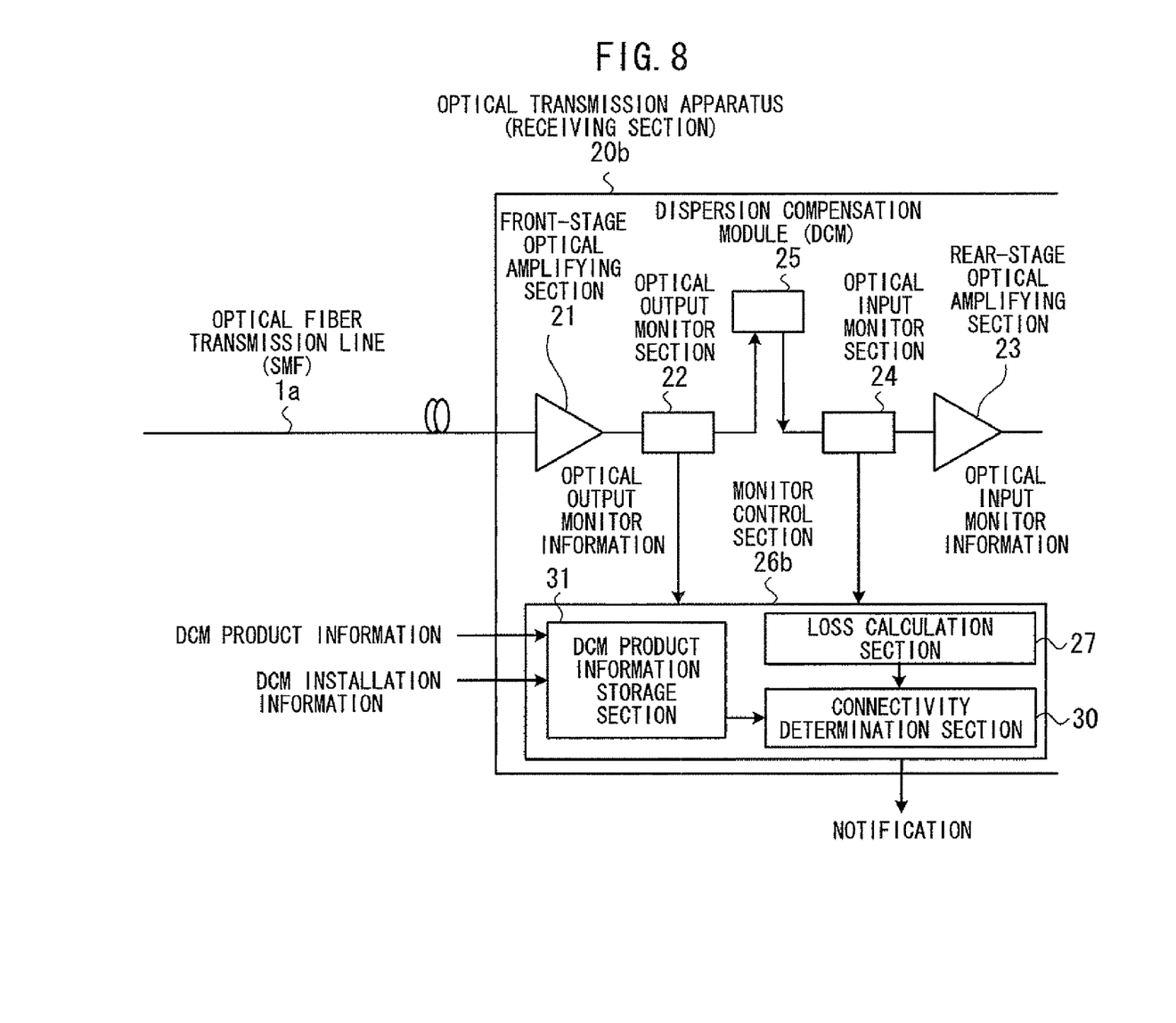
FIG. 8 is a block diagram showing a configuration of an optical transmission apparatus provided with a connectivity determination apparatus in accordance with an embodiment.

Hereinafter, specific applications will be described with reference to FIGS. 8 and 9. FIG. 8 is a block diagram showing a configuration of an optical transmission apparatus provided with an optical passive device product connectivity determination apparatus in accordance with an embodiment of the optical passive device product connectivity determination apparatus as the second embodiment. It should be noted that, for convenience of description, a like numeral in FIG. 8 refers to a like component in FIG. 3 (first embodiment). The following description will be focused on the features specific to the second embodiment.

As shown in FIG. 8, an optical transmission apparatus 20b provided with the optical passive device product connectivity determination in accordance with the second embodiment has a monitor control section 26b instead of the monitor control section 26a in the configuration shown in FIG. 3 (first embodiment). The monitor control section 26b replaces the DCM identification section 28 with a connectivity determination section 30, and also replaces the DCM product information storage section 29 with a DCM product information storage section 31.

The DCM product information storage section 31 contains the product information previously described in the first embodiment (correspondence table between a DCM loss and a product: see FIG. 4) and installation information indicating the type of an installed dispersion compensation module (DCM) 25

When a loss value of the installed DCM 25 is received from the loss calculation section 27, the connectivity determination section 30 selects a loss characteristic in the installation information about the DCM 25 from the product information stored in the DCM product information storage section 31 and then determines the connectivity of the DCM 25 by comparing the selected loss characteristic and the loss value calculated by the loss calculation section 27.

An example explaining a connectivity determination operation will be described in detail with reference to FIG. 9. For example, if the DCM 25 installation information stored in the DCM product information storage section 31 indicates a product C (1000 ps/nm) shown in FIG. 9, Loss min=4.5 [dB] and Loss max=6.0 are selected as the loss characteristic from the product information (see FIG. 4) stored in the DCM product information storage section 31. In this case, for example, the connectivity determination section 30 performs connectivity determination as shown in FIG. 9.

Figure 9:
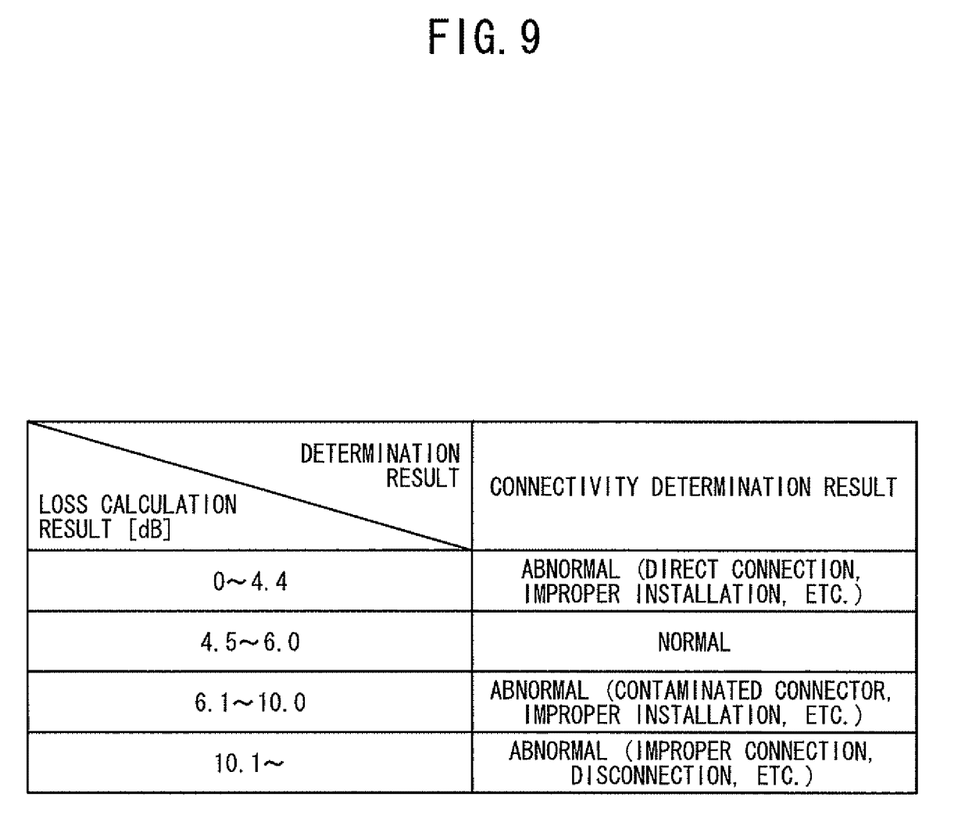
FIG. 9 is an example explaining a connectivity determination operation of a product C (1000 ps/nm).

More specifically, in FIG. 9, if the loss calculation result is in a range between 4.5 dB and 6.0 dB, which is within the loss characteristics of product C, the connectivity is determined as "normal". On the other hand, if the loss calculation result is in a range between 0 dB and 4.4 dB, which is below the loss characteristics of product C, the connectivity is determined as "abnormal (direct connection, improper installation, etc.)". If the loss calculation result is in a range between 6.1 dB and 10.0 dB, which is slightly above the loss characteristics of product C, the connectivity is determined as "abnormal (contaminated connector, improper installation, etc.)". Furthermore, if the loss calculation result is 10.0 dB or greater, which greatly exceeds the loss characteristics of product C, the connectivity is determined as "abnormal (improper connection, disconnection, etc.)".

As described above, according to the second embodiment, it is possible in a simple manner to detect not only abnormal connectivity due to aging deterioration during operation (such as contaminated connector and disconnection), but also abnormal connectivity such as direct connection, improper installation, improper connection, disconnection of an optical passive device product such as a DCM and a fixed optical attenuator, which has been installed at system configuration or maintenance. Accordingly, this embodiment provides increased reliability of a transmission apparatus in which an optical passive device product is installed.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An identification apparatus comprising:
    an optical input output monitor section monitoring an optical input and an optical output, respectively, of an optical passive device product inside an optical transmission apparatus connected to an optical fiber transmission line;
    a loss calculation section calculating a loss in said optical passive device product based on a monitoring result of said optical input output monitor section; and
    a product identification section in which product information indicating a correspondence between a loss characteristic and a product has been stored in advance, and which identifies said optical passive device product by comparing said stored product information and the loss calculated by said loss calculation section.

2. A connectivity determination apparatus comprising:
    an optical input output monitor section monitoring an optical input and an optical output, respectively, of an optical passive device product inside an optical transmission apparatus connected to an optical fiber transmission line;
    a loss calculation section calculating a loss in said optical passive device product based on a monitoring result of said optical input output monitor section; and
    a connectivity determination section in which loss characteristic information of said optical passive device product has been stored in advance, and which determines a connectivity of said optical passive device product by comparing said stored loss characteristic information and the loss calculated by said loss calculation section.

3. The connectivity determination apparatus according to claim 2, further comprising a storage section storing product information indicating a correspondence between a loss characteristic and a product and installation information about said optical passive device product, wherein said connectivity determination section selects said loss characteristic information from said product information based on said installation information stored in said storage section.

4. An identification apparatus comprising:
    means for monitoring an optical input and an optical output, respectively, of an optical passive device product inside an optical transmission apparatus connected to an optical fiber transmission line, to thereby provide a monitoring result;
    means for calculating a loss in said optical passive device product based on the monitoring result; and
    means for identifying said optical passive device product by comparing the calculated loss and stored product information indicating a correspondence between a loss characteristic and a product.

* * * * *